UNITED STATES PATENT OFFICE.

CHARLES DE LA HARPE, RUDOLF BURCKHARDT, AND ERNST ZEHNTNER, OF BASEL, SWITZERLAND, ASSIGNORS TO THE FIRM OF DYE WORKS FORMERLY L. DURAND, HUGUENIN & CO., OF BASEL, SWITZERLAND.

GALLOCYANIN DYE AND PROCESS OF MAKING SAME.

No. 898,039.  Specification of Letters Patent.  Patented Sept. 8, 1908.

Application filed April 21, 1908. Serial No. 428,410.

*To all whom it may concern:*

Be it known that we, CHARLES DE LA HARPE, chemist, RUDOLF BURCKHARDT, doctor of philosophy and chemist, and ERNST ZEHNTNER, doctor of philosophy and chemist, all citizens of the Swiss Republic, and residents of Basel, Switzerland, have invented new and useful Gallocyanins Derived from the Pyrogallolsulfonic Acid and a Process for the Manufacture of the Same, of which the following is a full, clear, and exact specification.

Some sulfonated gallocyanin dyestuffs are already known; they are obtained either by condensing nitrosoalkylamin-sulfonic acids or amido-azo-alkyl-amin-sulfonic acids with gallic acid or its derivatives, or by sulfonating the gallocyanins derived from gallanilid or by condensing nitrosoalkylamins with gallanilid-sulfonic acids; they all therefore, contain the sulfonic group in the first oxazin nucleus or in a side chain. We have discovered that new sulfonated gallocyanins may be obtained by condensing nitroso-mono-alkyl-arylamins, nitroso-di-alkylarylamins or nitrosodiarylamins with pyrogallolsulfonic acid. This condensation of nitroso-alkylarylamins with pyrogallolsulfonic acid occurs smoothly and the new sulfonated gallolcyanins thus obtained exhibit special properties of industrial value, particularly in wool dyeing. The condensation can be effected by heating a mixture of nitrosoalkylarylamin hydrochlorid and pyrogallolsulfonic acid, in a reflux apparatus, in a suitable medium, such as alcohol. A more simple method, however, consists in dissolving in alcohol the mass obtained by heating pyrogallol with sulfuric acid, adding to the solution a certain quantity of an alkali like sodium carbonate or an alkali salt like sodium acetate then introducing the nitrosoalkylarylamin and finally heating the mixture in a reflux apparatus until the reaction is completed. The sulfonated gallocyanins thus obtained are black powders, of which the blue solution in concentrated sulfuric acid becomes magenta-red when diluted with water. In the form of free acids these gallocyanins are insoluble in water; on the other hand they dissolve in an aqueous solution of sodium acetate to a blue solution and in an aqueous solution of an alkali to a violet solution. Wool, whether previously chromed or not, is dyed violet to blue tints by these dyestuffs, and a single bath process suffices, that is to say the mordant may be added to the dye-bath after the fiber has been dyed. Cotton mordanted with chromium compounds and printed with a pattern in a discharge, may be dyed by these dyestuffs blue with pure whites.

Example I. A mixture of 200 liters of methylalcohol, 22 kilos of pyrogallolsulfonic acid and 30 kilos of nitrosodimethylanilin hydrochlorid is boiled in a reflux apparatus until all nitroso-compound has disappeared. The whole is allowed to cool and filtered and the solid matter is dissolved in 1000 liters of warm water containing 10 kilos of sodium carbonate. After filtration the dyestuff is salted out by adding common salt, to the filtrate, and having been separated by another filtration, is pressed and dried. The dyestuff thus obtained is a black powder which dissolves in water to a blue solution.

Example II. 14 kilos of pyrogallol are introduced into 28 kilos of concentrated sulfuric acid of 66° Baumé specific gravity, and the mixture is heated for some hours at 100° C. After the mass has cooled, 200 liters of alcohol, 7 kilos of sodium carbonate and 17 kilos of nitrosodiethylanilin are added and the whole is heated in a reflux apparatus while stirring well, until the nitrosodiethylanilin has disappeared; the further operations for obtaining the dyestuff are like those described in Example I.

In the foregoing examples, for the nitrosodiethylanilin or nitrosodimethylanilin, may be substituted nitroso-mono-ethylanilin, nitroso-mono-methyl-anilin, nitrosomonomethyltoluidin, nitrosoethyltoluidin, nitrosodiphenylamin, or nitroso-ethylbenzylanilin-sulfonic acid.

What we claim is:

1. The described process for the manufacture of sulfonated gallocyanins consisting in condensing the nitroso derivatives of the aromatic amins usually employed for the manufacture of gallocyanins with pyrogallolsulfonic acid, in a suitable medium.

2. As new products the herein described sulfonated gallocyanins derived from pyrogallolsulfonic acid, which give with concentrated sulfuric acid blue solutions becoming magenta red when diluted with water, are insoluble in water in the form of free acids, dissolve in aqueous solutions of sodium acetate to a blue solution and in an aqueous solution of an alkali to violet solutions and dye wool violet to blue tints.

In witness whereof we have hereunto signed our names this 8th day of April 1908, in the presence of two subscribing witnesses.

CHARLES DE LA HARPE.
RUDOLF BURCKHARDT.
ERNST ZEHNTNER.

Witnesses:
GEO. GIFFORD,
AMAND RITTER.